Nov. 6, 1934.                E. B. BESSELIEVRE                1,979,955
                              DETRITING APPARATUS
                              Filed Oct. 25, 1930            4 Sheets-Sheet 2
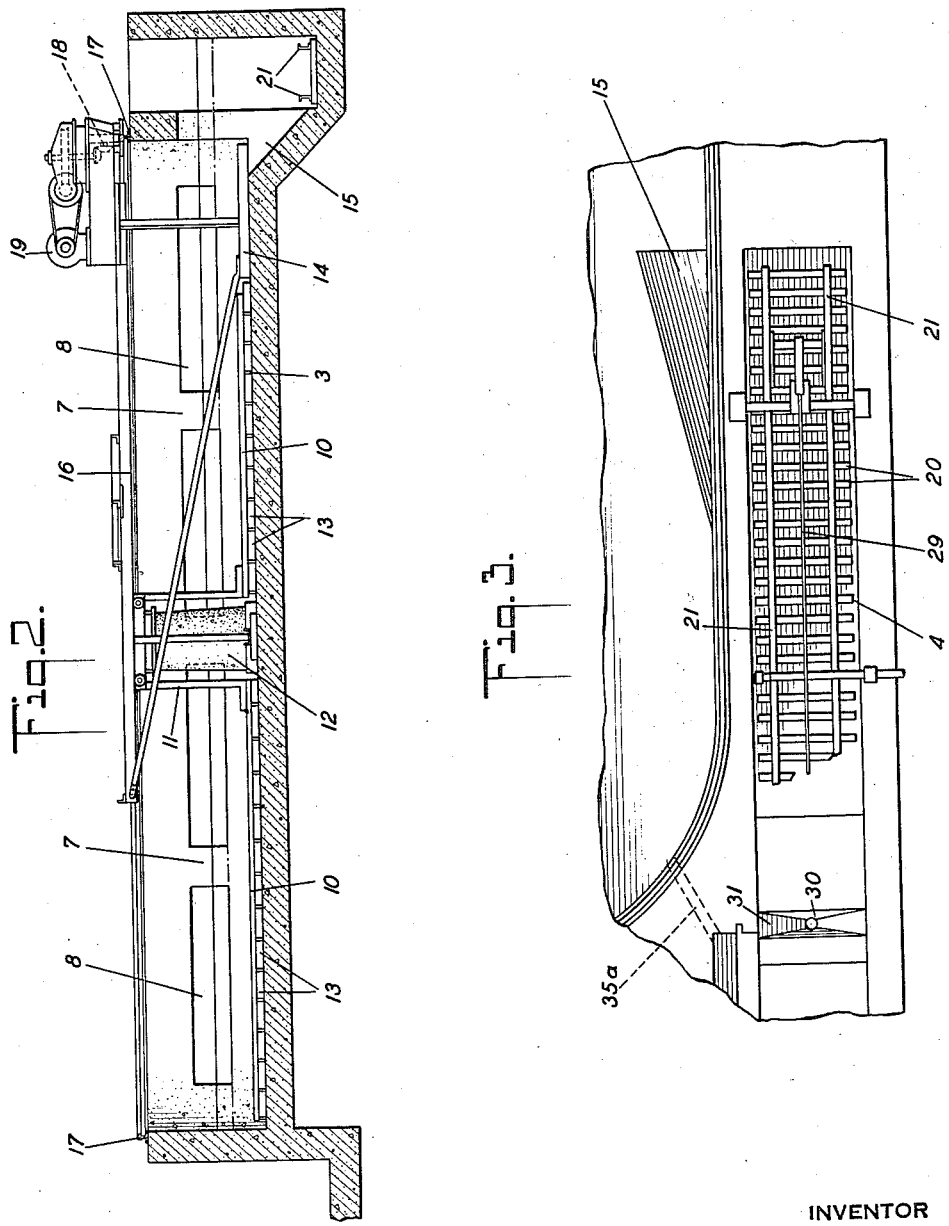
INVENTOR
E. B. BESSELIEVRE
BY
Arthur Middleton
ATTORNEY

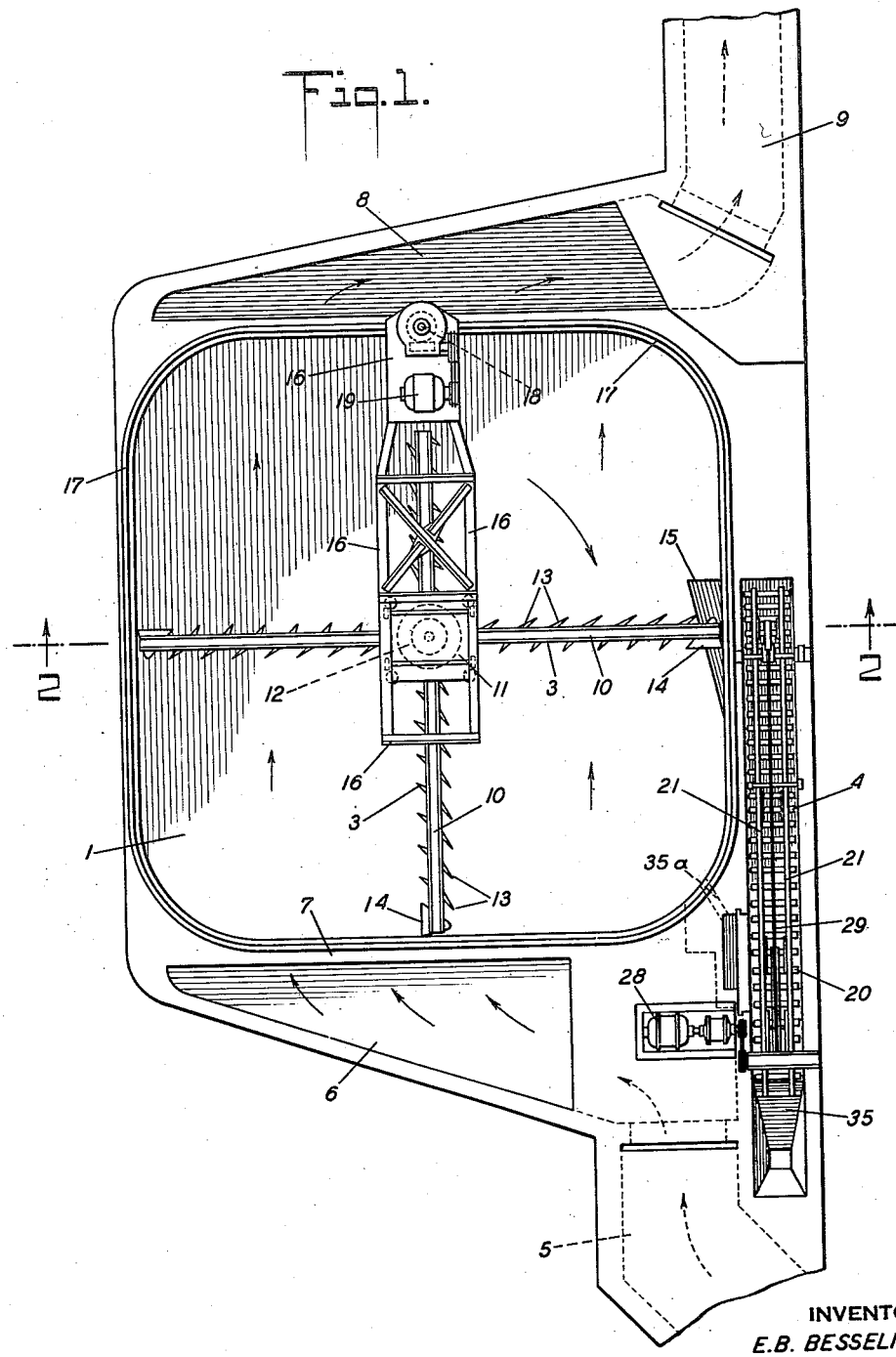

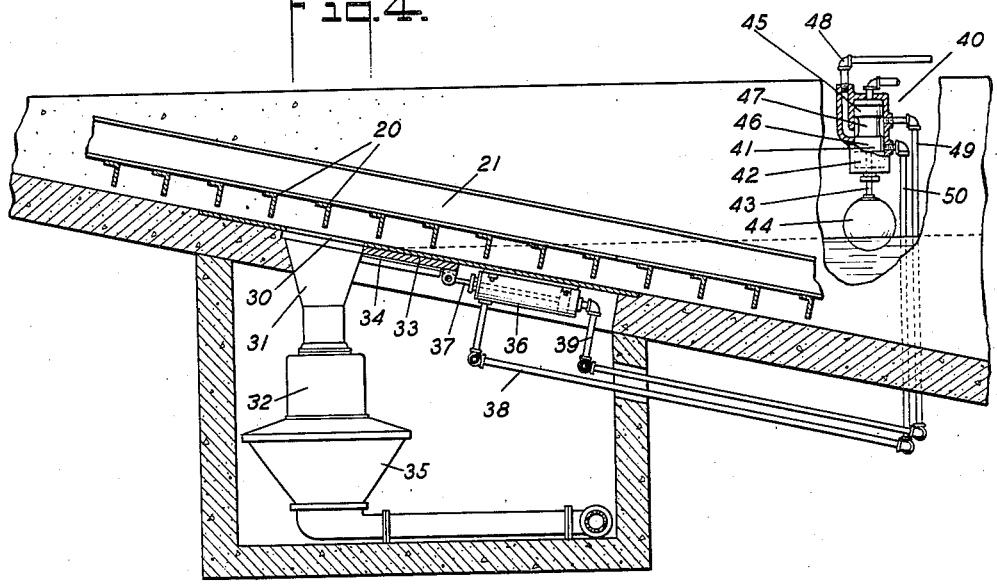
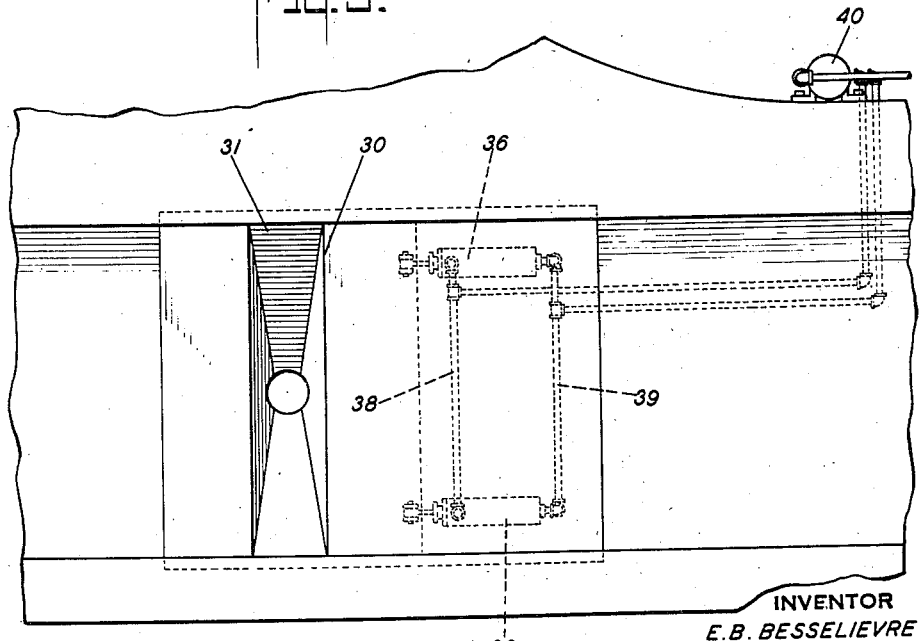

Nov. 6, 1934.   E. B. BESSELIEVRE   1,979,955
DETRITING APPARATUS
Filed Oct. 25, 1930   4 Sheets-Sheet 4
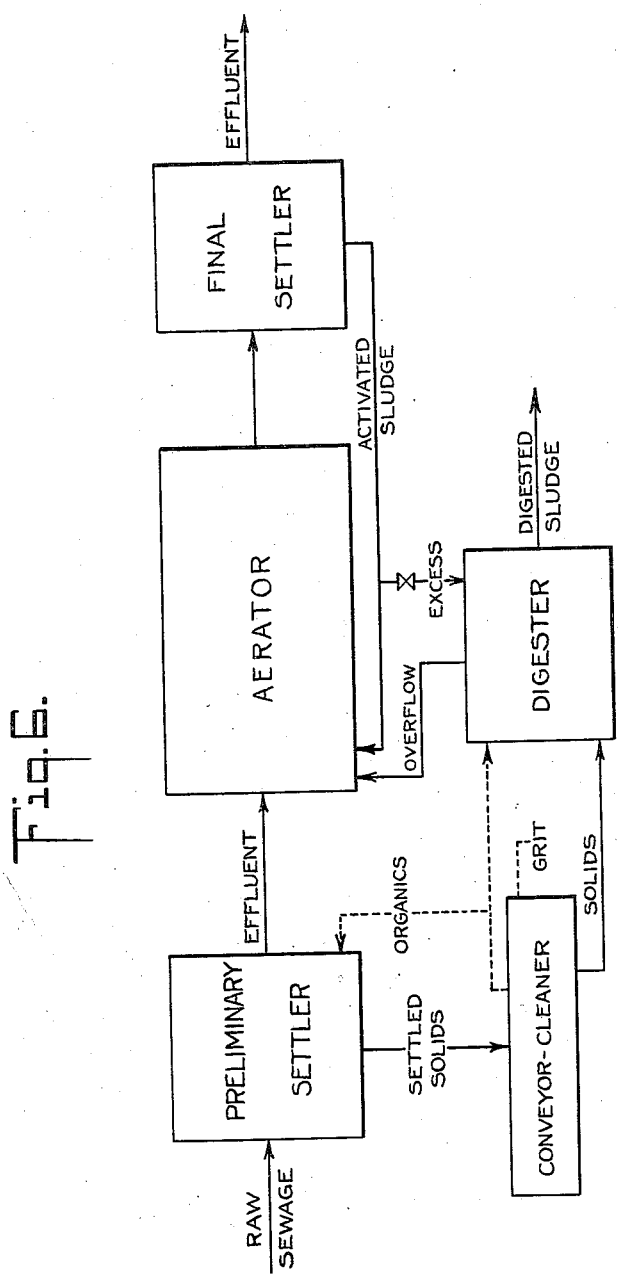
INVENTOR
E. B. BESSELIEVRE
BY
ATTORNEY Patented Nov. 6, 1934

1,979,955

UNITED STATES PATENT OFFICE 1,979,955

DETRITING APPARATUS

Edmund B. Besselievre, Spring Lake, N. J., assignor, by mesne assignments, to The Dorr Company, Inc., New York, N. Y., a corporation of Delaware Application October 25, 1930, Serial No. 491,126

6 Claims. (Cl. 210—3)

This invention relates to classifiers, and while intended more particularly for use in connection with sewage treatment as a detritor, that is, for grit removal from sewage, it is not to be understood that the invention is confined to this use alone. However, in order that this description may not be unnecessarily verbose, the invention will be described in connection with its application to sewage treatment. Furthermore, for purposes of this description, the sewage will be considered as made up of fluid with organic matter and with grit, both in suspension. Such matter as paper, rags and similar waste, will be included as organic matter merely because its disposal is to be through the same channels as the strictly organic matter.

Grit in the sewage has presented a problem in sewage disposal which has been troublesome and not heretofore satisfactorily solved. Its presence in sewage is detrimental to the proper functioning of the several steps employed in all treatment processes, and some means of removal is a prerequisite to present-day sewage disposal.

The problem of grit removal is augmented by the uneven flow to which sewage disposal plants are subject. Obviously the sewage flow is greatest in time of storm, and at such time the percentage of grit, caused by street dirt, ashes, sand and so forth, is much greater than in dry periods when the sewers carry only domestic sewage.

In the larger installations of sewage system, it is more or less common to provide an initial chamber for the settling of grit with a subsequent chamber for settling of organic matter. Disposal of the grit after it has settled presents a problem which is difficult to overcome in smaller installations and this expense, coupled with the cost of original installation has influenced towns and others having only small requirements to omit the grit chamber or attempt to overcome the problem in other ways. The primary object of the present invention is to obtain a system by which a preliminary settling chamber may suffice for both the organic settling chamber for domestic flow and as a grit settling chamber as required for storm flow.

The invention further contemplates provision of means for automatically changing the system to operate with preliminary settling of organics or settling of grit only.

Therefore, it can also be said that this invention resides in a method of automatically controlling selective grit removal from the mixture of grit and organic material which forms the sewage sludge. That is to say, grit is removed from the mixture in accordance with seasonal fluctuations in the grit content of the mixture. Excess of grit content is a consequence of increased seasonal flow of sewage and therefore occurs along with a rise in liquid level in the sewer system. This method therefore proposes to use the variations of that liquid level for the selective control of the removal of grit from the mixture.

At such times as the system is operating to separate the grit, it is desirable that the grit be so thoroughly separated that it may be immediately discharged and removed in an appropriate state of cleanliness as not to be putrid or obnoxious as fill. An object of the invention, therefore, is to provide a structure wherein a classifier operates during storm flow to efficiently classify as between organic matter and grit. And coupled with this object is the further object to utilize the classifying mechanism as part of the disposal system as a conveying means in dry weather for domestic flow.

With the specific problems mentioned above in view and with the objects already stated in mind, with other objects and advantages as may more clearly appear in the following description, one embodiment of the invention is illustrated in the accompanying drawings in which like numerals of reference indicate similar parts throughout the several views, and in which Figure 1 is a plan of an apparatus constructed in accordance with my invention;

Figure 2 is a cross sectional view on line 2—2 of Fig. 1 looking in the direction indicated by the arrows, that is, in the direction of flow in the chamber;

Figure 3 is a plan of a portion of the secondary compartment with the rake broken away and disclosing a certain gate open as occurs under normal flow through the apparatus;

Figure 4 is a longitudinal sectional view of the portion of the secondary compartment associated with said gate, showing the gate about to close due to the rising level of the fluid in said chamber;

Figure 5 is a plan of the gate showing the operating mechanism in association therewith; and Figure 6 is a diagrammatic view or flow sheet indicating the course and disposition of the matter being treated.

In the specific embodiment of the invention illustrated in said drawings, there is shown what may be termed a primary settling chamber 1 with which is associated a secondary compartment 2, both chambers having mechanical rakes 3, 4 respectively therein. The primary settling chamber 1 may be of appropriate size and desired shape, but for purposes of the present disclosure is shown rectangular in form, since such chambers provide the greatest economy of space, being particularly desirable where concrete construction is employed, and, by permitting even uniform flow directly across the chamber, result in a maximum decrease in velocity, uniform velocity at all points in the chamber, and a consequent efficiency in settling out the solids in a minimum of ground space.

The form of chamber shown is designed for double use, namely as a preliminary sewage settling chamber under dry weather flow and as a preliminary grit settling chamber under storm flow. The sewage enters through the sewer 5 and passes through an influent channel 6 into the settling chamber through appropriate inlet openings extending substantially throughout the length of the entry side of the settling chamber for establishing a substantially even flow across the width of the chamber. The sewage flows uniformly across the entire chamber at a greatly reduced velocity, the size of the chamber being designed to permit a predetermined period of detention for the liquid, this period being sufficient for all solid particles having a settling rate above a given predetermined rate to settle to the bottom of the chamber. The remaining solids, if any, together with the liquid, overflow a weir 7 (see Fig. 2) into a spillway 8 connecting with an effluent discharge pipe 9. Under normal or dry weather flow conditions, the chamber is designed to permit organic solids to settle in this chamber together with such small amount of grit as is present under those conditions. The design of parts is furthermore such that under the increased velocity of flow in time of storm, substantially only the grit settles in this chamber and the organic matter is carried through and out with the effluent.

Various types of scraping mechanisms or mechanical rakes 3 suitable for intermittent or continuous operation may be used, depending partly on the shape of the chamber. Where possible it is desirable to employ a mechanism of the rotating type, and to have such mechanism arranged to impel the settled solids outwardly for discharge in a suitable zone at the periphery of the tank, as this permits very convenient location of the secondary compartment. One form of raking mechanism may comprise scraping means such as rake arms 10 mounted on a rotary framework 11 pivotally supported on a pillar 12 in the center of the chamber 1 at a point above the high water level. Vertical scraping blades or rakes 13 extend downwardly from the arms 10 and are set at such an angle that by rotation of the framework and arms the rakes 13 engage settled solids and impel them toward the periphery of the chamber 1. At the outer end of each arm 10 suitable means, such as scoop 14, is provided for collecting settled solids raked into its zone of travel and carrying the same to a suitable discharge opening or chute 15. It will be apparent that the arms 10 with blades 13 will serve to rake all solid matter settling in a circular zone extending from the pillar 12 to the path of the outermost blade, depositing such material in the path of the scoops.

For collecting solid material settling outside the zone of action of arms 10, particularly in the corners of chamber 1, and for rotating the framework 11 and the rake arms 10, a sliding frame 16 is mounted on framework 11 and a track 17 extending around the periphery of chamber 1. The outer end of the sliding frame 16 carries a wheel 18 (Fig. 1) resting on track 17 to support one end of the frame, with suitable drive means, including a motor 19, for rotating the wheel. The central end of sliding frame 16 is supported on the rotary framework 11 so as to impart rotary motion thereto and permit the necessary longitudinal movement of frame 16 as the wheel 18 approaches and recedes from the corners of the chamber 1. A suitable collecting device is mounted on the frame 16 for scraping the corners of chamber 1, and may comprise a scoop 14 having a sufficient spread to cover the distance between the extreme corner of the chamber 1 and the adjacent path of scoops 14.

The secondary compartment 2 may be located in any position where it can readily receive the settled solids in the form of sludge discharged from the settling chamber 1 and return to said chamber any excess of liquid, together with any more slowly settling solids which it is desired to retain in the liquid. A convenient arrangement for this purpose comprises an inclined trough having a sloping bottom with its lower end adjacent the periphery of chamber 1 interconnected therewith and in position to receive settled solids discharged from the chamber. The upper end of this trough-like secondary compartment is well above high water level. Suitable mechanism 4 is provided for raking the settled solids upwardly along the inclined bottom and discharging them in a drained state from the upper end. The rake mechanism which is partially submerged is driven by means operable to actuate said mechanism either as a conveyor without any appreciable agitation or as a combined elevator and fluid agitator. Thus the rake mechanism may be used either to rake all settled solids to discharge them without throwing the lighter or organic materials into suspension, or to produce sufficient agitation to throw the lighter solids or organics into suspension so that they may return to the chamber 1. The latter operation is desirable when the apparatus is functioning as a sewage grit chamber during storm flow, the agitation serving to free organic solids from the grit to produce a clean, inoffensive grit without further treatment.

The secondary compartment raking apparatus, ordinarily referred to as a classifier mechanism, the same being here shown as including well known details as a plurality of transverse scraping blades 20 mounted on longitudinal channels 21. The channels 21 are carried by two hangers one of them near the discharge end and the other toward the lower end, both hangers being supported by interconnected bell cranks respectively, the upper one of which has a rocker lever depending therefrom for actuation by a cam 27 driven through suitable reduction gears by a motor 28. This construction generally known in a "Dorr" classifier obtains an offsetting movement of the entire rake toward and away from the bottom of the trough. Reciprocation of the rake is obtained by a crank-operated pitman 29, the combined offsetting movement with this reciprocal movement resulting in an orbital movement by which the materials settling on the bottom of the trough will be intermittently dragged up the incline with a step by step motion.

As has been previously indicated, this secondary compartment receives organic matter from the primary chamber under normal flow. At such time, the secondary compartment is intended to do little, if any, classifying, the rake being used only as a conveyor or elevator for removing the settled sludge from the liquid. Part way up the inclined bottom of the secondary compartment, preferably slightly above the normal fluid level, is a gate opening 30 extending entirely across the compartment. As the sludge settles in the bottom of the compartment, the rake actuates the same up the incline to the gate opening where the sludge drops down in a funnel-like collector 31. The collector 31 passes the sludge to the receiving chamber of an ejector 32 from which it will be periodically ejected with force to the digester. The construction, per se, of the ejector forms no part of the present application, and therefore further description is thought unnecessary herein.

Under storm conditions, in order to use the secondary compartment as a classifier, it is necessary to close the gate opening 30, and in the present showing this is accomplished by a sliding gate 33 slidably mounted in appropriate grooves 34 in the side walls of the compartment. When the gate is closed, the rake will cause the settled gritty solids to pass all the way up the incline and discharge over the upper end thereof in an appropriate hopper 35, the liquid and suspended matter therein being returned from the classifier or secondary compartment through the so-called organics return duct or discharge 35a into the primary chamber.

It should be understood that the change in the operation of the secondary or classifier compartment from normal operating condition is brought about by the change of liquid level in the tank as caused by abnormal or stormflow conditions. Under such abnormal conditions the general level in the sewer system may rise to an extent where it will more or less flood the overflow weir of the tank 1. At any rate, the rise incidental to such seasonal swelling of the sewage flow is sufficient to be utilized through suitable relay means to affect a change in the operation of the secondary compartment as described above, so that the mechanism therein may function as a grit separator instead of as a mere mixed sludge conveyer. It will be understood that such change in the operation consists in automatically closing the gate 33, and allowing grit to be carried beyond the gate to a point of discharge, while along therewith the raking speed may also be automatically increased in order to intensify the classifying action. In this way, an objectionable excess of grit caused by stormflow is removed from the system, while organic solids are caused to return to the main tank 1 by way of the so-called organics return 35a which latter of itself is known in the art. The relay means shown consists of a float control arrangement presently to be described.

Sliding gate 33 is preferably operated automatically, and as part of the operating mechanism a cylinder 36 is shown adjacent each end of the gate pointed in the direction of movement of the gate. A piston in each cylinder is connected by a piston-rod 37 with the edge of the gate so that reciprocation of the said rods will obtain a sliding of the gate. Both ends of the cylinders are closed, and corresponding ends of the cylinders are connected as by pipes 38, 39 so as to operate both pistons simultaneously. For convenience, the upper pipe 38 nearest the gate will be referred to as the opening pipe and the lower one 39 or pipe furthest from the gate, will be referred to as the closing pipe.

Mounted in the secondary compartment over the lower zone which contains fluid is a float valve 40. This valve is shown as of a plunger type, utilizing a plunger 41 slidable within a cylinder 42 from which a stem 43 depends to a float 44 by which the valve will be raised with an increase in the liquid level. The plunger has end portions 45 and 46 which fit the cylinder and a middle reduced portion 47 connecting said end portions. An inlet supply pipe 48 for air or other desired fluid pressure, connects with the inside of the cylinder around the middle reduced portion of the plunger. Actuating connections 49, 50 extend from longitudinally separated points at the side of the cylinder to the opening and closing pipes 38, 39 to the gate operating cylinders. The actuating connections 49, 50 are properly located with respect to the plunger to permit only one connection at a time to be in registration with the reduced portion of the plunger and thus in communication with the fluid pressure. As shown, when the valve plunger 41 is in upper position fluid pressure is admitted from the source of supply 48 to connection 47 and thence to the lower end of the gate actuating cylinders for closing the gate. It is this connection which is shown open in Figure 4, and therefore the gate is about to close. When the plunger valve lowers, the other connection 50 transmits the fluid pressure to the upper ends of the gate actuating cylinders and will cause the gate to open. By this construction, the gate will be automatically operated by the fluctuation of the liquid level from normal elevation to the higher level due to storm and vice versa.

In order that the rake in the secondary compartment may function to classify the solids under storm condition but will function only as a conveyor under normal flow, means may be provided for automatically altering the speed of the rake under the normal and storm flows. This alteration of speed may be by mechanical means, such as a speed reduction gear operated by either mechanical connection to the float or by a combined mechanical and electrical connection. On the other hand, reduction and increase in the speed of the rake may be by varying the speed of the driving motor as by operating a rheostat or other current control in the current supply to the motor. Obviously whatever specific speed varying means is adopted, its function will be to automatically increase the speed of the rake at the same time the sludge gate closes and to reduce the speed when said gate opens.

Having thus described the invention, I claim:—
1. In an apparatus of the character described, the combination with a settling chamber having a sloping bottom, said bottom having a discharge opening above the normal fluid level of the compartment, automatically operable means opening and closing said opening, and means for raking material to said opening when open and past said opening when closed.

2. In an apparatus of the character described, the combination with a settling chamber having a sloping bottom, said bottom having a discharge opening above the normal fluid level of the compartment, automatically operable means operated by the fluid level in the compartment for closing said opening as the level rises and opening the same as the level lowers, and means for raking material to said opening when open and past said opening when closed.

3. In an apparatus of the character described, the combination with a settling chamber having a sloping bottom of means cooperating therewith for raking material up said sloping bottom and discharging the same at one of a plurality of discharge openings, a gate for closing the lower discharge opening, and a float valve for controlling the opening and closing of said gate from the fluid level in the compartment.

4. In an apparatus of the character described, the combination with a settling chamber having a sloping bottom of means cooperating therewith for raking material up said sloping bottom and discharging the same at one of a plurality of discharge openings, a gate for closing the lower discharge opening, a piston and cylinder for operating said gate, and a float valve for controlling pressure supply to said piston and cylinder for opening and closing said gate dependent upon the fluid level in the compartment.

5. In sewage treating apparatus, a container, a partially submerged solids classifying device therein effective to induce flow conditions for separating a mixture of sewage sludge into organic material and gritty material at a point of emergence of said classifying device, an independent discharge for the separated gritty material and for the separated organic material, and liquid level operated means for controlling the separating action of said classifying device.

6. A process of treating sewage sludge produced from the sewage delivered from a sewer system and having therein mixed grit and organic material, whereby normally mixed material is conveyed from submergence to emergence and removed, characterized by automatically controlling selective grit removal from said mixture in accordance with seasonal fluctuations in the grit content, and using for such control the variations in the general liquid level in the sewer system, incidental to such fluctuations.

EDMUND B. BESSELIEVRE.